Oct. 18, 1955 H. H. HEDLUND 2,720,798
SAW GRINDING MACHINE
Filed June 11, 1953 2 Sheets-Sheet 1
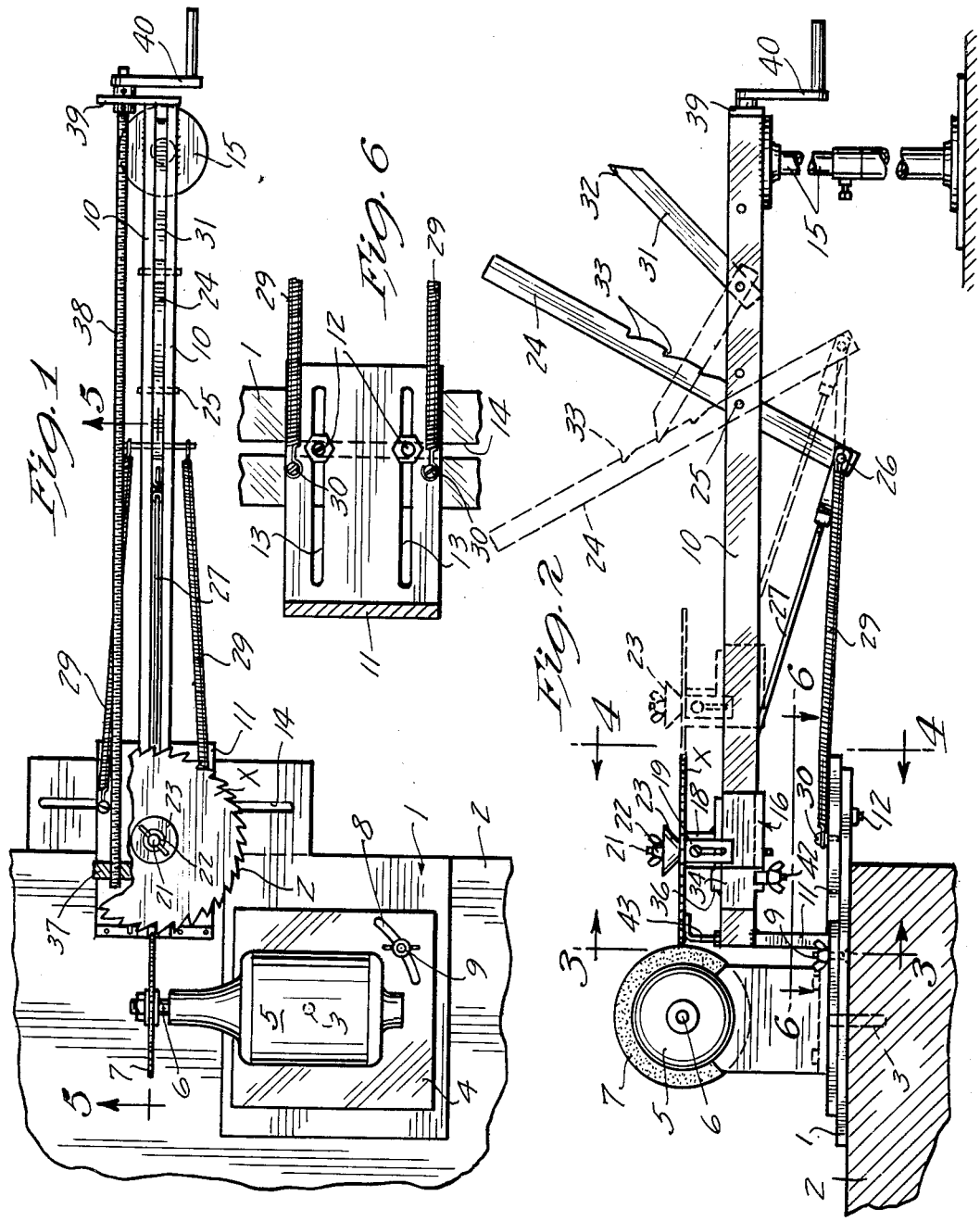
INVENTOR.
Henry H. Hedlund
BY
Merchant & Merchant
ATTORNEYS Oct. 18, 1955     H. H. HEDLUND     2,720,798
SAW GRINDING MACHINE
Filed June 11, 1953                2 Sheets-Sheet 2
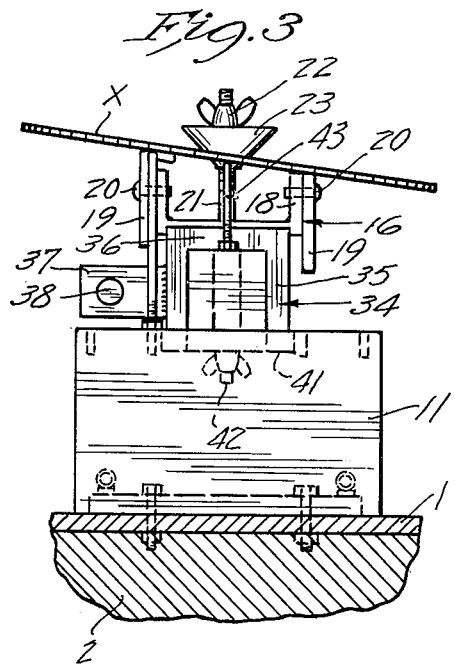
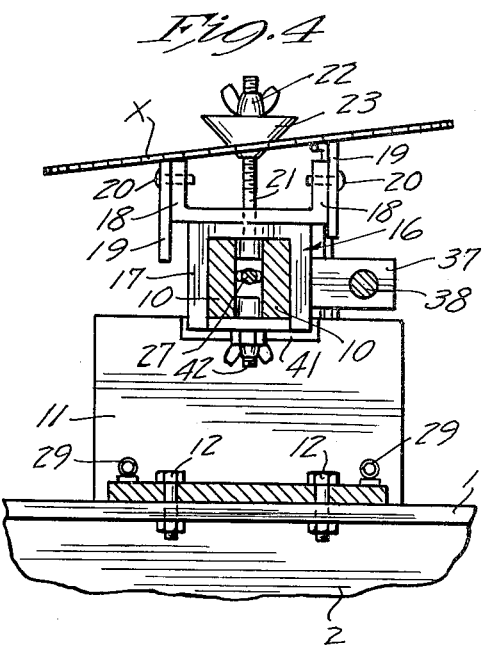
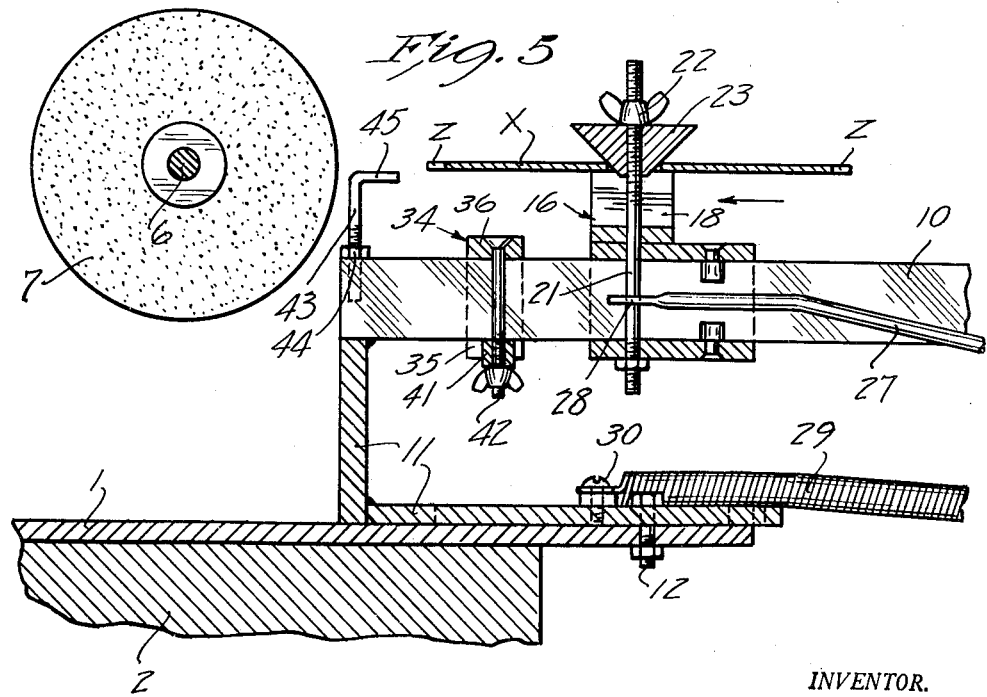
INVENTOR.
Henry H. Hedlund
BY
Merchant & Merchant
ATTORNEYS

United States Patent Office 2,720,798
Patented Oct. 18, 1955

2,720,798

SAW GRINDING MACHINE

Henry H. Hedlund, South Haven, Minn.

Application June 11, 1953, Serial No. 360,867

3 Claims. (Cl. 76—43)

My invention relates to saw sharpening machines, and more particularly to machines for sharpening circular saw blades. An important object of my invention is the provision of a device of this class which has an increased efficiency and output as compared with machines heretofore produced. To this end, I provide a novel combination of parts and saw blade mounting means whereby blades of different diameters and tooth arrangement may be quickly and easily gummed and sharpened without undue loss of time and without great skill and training.

A still further object of my invention is the provision of a device of the class described in which reciprocatory movements of the saw blade toward and from the power driven rotary abrasive wheel and the desired angular or tilted position thereof may be readily and positively obtained in a minimum of time and with a minimum of effort.

A still further object of my invention is the provision of novel stop means and adjustment therefor for the reciprocatory mounted saw blade holder whereby the saw teeth may be ground to an exact pre-determined depth, and in which said depth may be maintained uniform throughout the several teeth on the blade.

A still further object of my invention is the provision of devices of the class described which can be relatively inexpensively produced, which are relatively light in weight, and compact, which are easy to operate, and which are extremely durable in use.

The above and still further objects of my invention will become apparent from the following detailed specification, appended claims, and attached drawings.

Referring to the drawings, wherein like characters indicate like parts throughout the several views:

Fig. 1 is a fragmentary top plan of my novel structure, some parts being broken away and some parts being shown in section;

Fig. 2 is a view in side elevation of the machine of Fig. 1;

Fig. 3 is an enlarged view partly in plan and partly in section taken substantially on the line 3—3 of Fig. 2;

Fig. 4 is an enlarged transverse section taken on the line 4—4 of Fig. 2;

Fig. 5 is a fragmentary view partly in section and partly in side elevation taken substantially on the line 5—5 of Fig. 1, some parts being broken away; and Fig. 6 is an enlarged fragmentary horizontal section taken substantially on the line 6—6 of Fig. 2.

Referring with greater particularity to the drawings, the numeral 1 indicates a horizontally disposed base plate adequately secured by any suitable means to an upstanding support 2. Pivotally secured, as at 3, to the base plate 1 is a mounting plate 4 having thereon an electric motor 5, to the horizontally disposed drive shaft 6 of which an abrasive wheel 7 is rigidly secured for rotation. As shown, the mounting plate 4 has a segmental slot 8 upwardly through which a thumb nut equipped stud 9 projects from the base plate 1. In this manner, limited arcuate movements of the abrasive wheel 7, as it rotates on a horizontal axis, are achieved.

A pair of laterally spaced parallel guide rails 10 are secured at their forward ends to an L-shaped mounting bracket 11. Bracket 11 is in turn secured to the base plate 1 through the medium of a pair of headed studs 12, which extend through spaced parallel longitudinally extended slots 13 therein and through a transverse slot 14 in the base plate 1. At their rear ends, the rails 10 are pivotally secured to a supporting post 15, preferably and as shown being vertically adjustable. By this arrangement, it should be obvious that the rails 10 are mounted for longitudinal and transverse sliding movements with respect to the abrasive wheel 7, and the forward ends thereof are capable of swinging movements in a horizontal plane. Mounted for reciprocal sliding movements on the rails 10 is a saw blade holder, identified in its entirety by the numeral 16, and including a generally rectangular carriage 17 (see Fig. 4) having laterally spaced upstanding legs 18, which may be formed integrally with the carriage 17 or rigidly secured to carriage 17 by any suitable means not shown. Vertical extensibility of the legs 18 is achieved through the medium of extension members 19 slidably secured thereto by means of machine screws 20. Projecting upwardly through the carriage 17, intermediate the rails 10, is a bolt 21, the upper end of which is screw-threaded and is provided with a thumb nut 22. A conical saw blade centering member 23 is positioned above a saw blade X and is adapted to be inserted at least partially into the central opening Y thereof (see Fig. 5). As shown in Figs. 3 and 4, vertical adjustability of the legs 18 makes it possible to tilt the saw blade X mounted thereon in opposite directions from the horizontal, transversely of the rails 10.

For the purpose of imparting reciprocatory movements to the saw blade holder 16, I provide a lever 24 which is pivotally secured at its intermediate portion, as indicated at 25, between the rails 10 in spaced relation to the rear ends. Pivotally secured to the lower end portion of the lever 24, as indicated at 26, is a link 27, the forward end of which is hooked around the bolt 21, as indicated at 28. A pair of coil tension springs 29 are interposed between the lower end portion of the lever 24 and the mounting bracket 11 as indicated at 30. Springs 29 thus bias the lever 24 and blade holder 16 toward the full line positions of Fig. 2. In order to position the blade holder 16 in a desired set position rearwardly of the abrasive wheel 7, such as indicated by the dotted lines in Fig. 2, for the purpose of grinding different saw blades of varying diameters, I provide a latch bar 31 which is also pivotally secured between the rear end portions of the rails 10 for swinging movements from the full line to the dotted line positions of Fig. 2. The relatively pointed free end 32 of the latch bar 31 is adapted to engage the longitudinally spaced detents 33 on the intermediate portion of the lever 24. For the purpose of positively locking the blade holder 16 in a desired set position on the rails 10, I provide a novel stop means, identified in its entirety by the numeral 34, and including a generally U-shaped member 35, the upper end portion 36 of which rests upon the upper surfaces of the rails 10. Projecting laterally from one side of the U-shaped member 35 is a traveler 37 which has screw-threaded engagement with the longitudinally extended screw 38 secured at its rear end to a mounting plate 39 projecting laterally outwardly from the rear end portions of the rails 10. As shown, at its extreme rear end, the screw 38 is provided with a turning crank 40. Screw 38 is laterally spaced from but parallel to the rails 10, and therefore rotation thereof, through the medium of the crank 40, will cause longitudinal movements of the stop member 35 along the rails 10. When a desired set position is arrived at, definite locking relationship between the stop member 35 and the rails 10 is achieved through the medium of a transverse locking bar 41 which is clamped against the undersurfaces of the rails 10 by means of a thumb nut equipped screw 42 projecting therethrough and through the upper end portion 36 of the stop member 35.

To adequately support the radially outwardly projected portion of the saw blade X immediately adjacent the teeth Z thereof, I provide a supporting standard 43 which is vertically adjustably mounted on the L-shaped mounting bracket 11, the same being screw-threadedly received therein. A stop nut 44 is provided to positively lock the supporting standard 43 in a desired vertically adjusted position. Also preferably and as shown, the supporting standard 43 is provided with a rearwardly projected finger 45.

My device has been thoroughly tested and found to be completely satisfactory for the accomplishment of the above objects, and while I have disclosed a preferred embodiment thereof, I wish it to be understood that same is capable of modification without departure from the scope of the appended claims.

What I claim is:

1. A device for sharpening circular saw blades comprising a base plate, a power driven rotary abrasive wheel mounted on said base plate for rotation on a horizontal axis, a pair of guide rails associated with said base, a saw blade holder mounted on said guide rails for reciprocatory movements toward and away from said abrasive wheel, adjustable stop means on said rails limiting movements of said holder toward said abrasive wheel, yielding means urging said saw blade holder toward engagement with said abrasive wheel, a saw-supporting standard vertically adjustably mounted on the forward end portion of said rails and adapted to support the undersurface of said saw blade adjacent the teeth thereof, adjustable means for supporting said saw blade in tilted positions transversely of said rails, and means for imparting reciprocatory movements to said blade holder on said rails, said means including a lever pivotally secured at its intermediate portion between said rails, and a link pivotally connected to the lower end of said lever at its rear end and to the blade holder at its forward end.

2. The structure defined in claim 1 in which said yielding means includes a coil tension spring connected to the lower end of said lever, and in which the lever above said rails is provided with a plurality of detents adapted to receive the free end of a latch bar pivotally secured between said rails rearwardly of said lever whereby to lock said blade holder in a desired set position against the tension of said spring.

3. The structure defined in claim 1 in which the adjustable stop means includes a stop bar transversely of said rails, and an elongated crank-equipped screw laterally spaced from and parallel to said rails, and a traveler on said screw rigidly secured to said stop bar.

References Cited in the file of this patent

UNITED STATES PATENTS

| | | |
|---|---|---|
| 164,068 | Burgher | June 1, 1875 |
| 184,832 | Burgher | Nov. 28, 1876 |
| 298,928 | Willey | May 20, 1884 |
| 1,050,464 | Huther | Jan. 14, 1913 |
| 1,087,107 | Conrad | Feb. 17, 1914 |